United States Patent [19]

Tiessens et al.

[11] 3,975,335

[45] Aug. 17, 1976

[54] SULPHURCURABLE POLYMER OF ETHYLENE AND AT LEAST ONE OTHER α-ALKENE WITH REDUCED COLD FLOW PROPERTIES

[75] Inventors: Meindert Tiessens, Beek (L); Henricus J. M. Van Gorcom, Stein, both of Netherlands

[73] Assignee: Stamicarbon B.V., Geleen, Netherlands

[22] Filed: Aug. 2, 1971

[21] Appl. No.: 168,417

Related U.S. Application Data

[63] Continuation of Ser. No. 821,959, May 5, 1969, abandoned.

[30] Foreign Application Priority Data

May 3, 1968 Netherlands.................. 6806352

[52] U.S. Cl. .......................... 526/283; 260/79.5 B; 260/888; 260/892

[51] Int. Cl.² ................... C08D 3/04; C08D 1/14; C08D 9/00

[58] Field of Search ........................... 260/80.78

[56] References Cited

UNITED STATES PATENTS 3,554,988   1/1971   Emde ........................... 260/79.5 B

*Primary Examiner*—Christopher A. Henderson
*Attorney, Agent, or Firm*—Cushman, Darby & Cushman

[57] ABSTRACT

The present disclosure relates to the preparation of curable polymers of ethylene with at least one α-alkene and a 5-alkylidene norbornene-2 showing a reduced cold-flow obtained by the incorporation of dicyclopentadiene in amounts of at least 0.2 % and preferably between 0.4 and 2.2 % by weight with respect to the amount of polymer and in a molar ratio of less than 1 : 5 to the norbornene derivative.

1 Claim, No Drawings

SULPHURCURABLE POLYMER OF ETHYLENE AND AT LEAST ONE OTHER α-ALKENE WITH REDUCED COLD FLOW PROPERTIES

CROSS-REFERENCE TO RELATED APPLICATIONS

This is a continuation of our copending application Ser. No. 821,959, filed May 5, 1969, now abandoned.

The invention relates to a process for the preparation of a sulphur-curable polymer of ethylene, at least one other α-alkene and a 5-alkylidene norbornene-2, which possesses reduced cold-flow properties.

Polymers of ethylene, an α-alkene and a 5-alkylidene norbornene-2 that can be cured with sulphur are known in the art; see e.g. British patent specification No. 953,622 and U.S. Pat. No. 3,191,173, which mention application of 5-methylene norbornene-2 and 5-ethylidene norbornene-2 respectively as the third monomer. By way of indication of the amount of third monomer needed for ensuring sufficient curing of the polymer, it is recommended to use such an amount of third monomer that the polymer will have an iodine number of at least 5 and/or the polymer will contain at least appr. 0.03 moles of third monomer per 100 g. For 5-methylene-norbornene-2 this is equivalent to appr. 2.4 and 3.3 % by weight respectively, and for 5-ethylidene norbornene-2 to 2.7 and 3.6 % by weight respectively.

However, those trained in the art will determine how large the amount of these long-known comonomers in the polymer has to be for each separate application of the polymer; in making the choice due consideration is to be given not only to the desired rate of curing and the mechanical properties of the vulcanisate, but also to the high price of the comonomer.

From the Dutch Pat. No. 6,711,349 it is known that polymers can be prepared from two α-alkenes containing 2 to 4 carbon atoms, dicyclopentadiene, and an alkylidene norbornene, or a given alkenyl norbornene, the molar ratio of dicyclopentadiene to the norbornene compound being 1 : 5 to 5 : 1, preferably 1 : 3 to 3 : 1. The object is to prepare rapidly curable polymers, using as little as possible of the costly norbornene compound.

It will be obvious that a reduction of the amount of 5-alkylidene norbornene-2 to be copolymerized decreases the selling price of the ultimate polymer. It also appears then that the curing rate of the polymer remains at an acceptable level, and that the properties of the cured product remain equal, if not improve; the latter holds in particular for the resistance to aging at elevated temperature. A drawback of a reduction in comonomer content is, however, that the cold-flow increases. Cold-flow is the phenomenon that the uncured polymer is liable to deformation under load at room temperature, with the consequence that during storage of the uncured, normally baled, product serious difficulties are liable to occur, e.g. owing to sagging over, or collapsing of the stacked bales.

The invention aims at providing a process for producing sulphur-curable polymers of ethylene, at least one other α-alkene and a 5-alkylidene norbornene-2, which possesses high cold-flow values and, in consequence, can be easily stored. Another aim is the production of polymers that can be readily processed, possess a high rate of curing and can be very readily cured with sulphur to yield products with excellent properties. Other advantages will be dealt with later.

The process for the production of a sulphur-curable polymer of ethylene, at least one other α-alkene and a 5-alkylidene norbornene-2, with reduced cold-flow properties, is characterized in that also dicyclopentadiene is incorporated in the polymer in an amount of at least 0.2 % by weight with respect to the amount of polymer, the ratio of dicyclopentadiene to 5-alkylidene norbornene-2 being lower than 1 : 5.

When less than 0.2 % by weight of dicyclopentadiene is incorporated in the polymer, no, or only a very slight improvement in cold-flow behaviour is achieved in most cases. Preferably, quantities of 0.4–2.2 % by weight, and, more specifically, of 0.7–2.0 % by weight of dicyclopentadiene are employed. The molar ratio of dicyclopentadiene to the 5-alkylidene norbornene-2 in the polymer prepared, more specifically is lower than 1 : 6. It is pointed out that application of dicyclopentadiene as a third monomer in the preparation of ethylene-α-alkene polymers is known in the art, but that, normally, much larger quantities of it are contained in the polymer (see e.g. British Pat. specification No. 880,904).

The literature nowhere states that the mixture of the polyunsaturated monomers that is to be used according to the invention, has favourable effect on the cold-flow behaviour of the polymer.

α-alkenes suited for the purpose are the α-alkenes with at most 9 carbon atoms, e.g. propylene, butene-1, pentene-1, hexene-1, octene-1, their branched isomers, e.g. 4-methylpentene-1, or styrene and/or α-methylstyrene, or mixtures of these α-alkenes. Particularly suited is propylene or a mixture of propylene and butene-1.

Preferably, 5-ethylidene norbornene-2 is used as the 5-alkylidene norbornene-2, because this need neither be present in large excess during the polymerization, nor be incorporated in a large amount, to yield a readily curable product with excellent properties. Other suited alkylidene norbornenes are e.g. 5-methylene norbornene-2, 5-isopropylidene norbornene-2, 5-isobutylidene norbornene-2, 5-heptylidene norbornene-2, 5-decylidene norbornene-2 and 5-tridecylidene norbornene-2. The polymer normally contains at least 0.125 mole of 5-alkylidene norbornene per 1000 g. Since upon incorporation of more than appr. 0.75 mole of 5-alkylidene norbornene-2 per 1000 g of polymer, cold-flow is normally not observed in the polymer, the polymers according to the invention usually contain appr. 0.125 to 0.75 mole of 5-alkylidene norbornene-2 per 1000 g of polymer. The proportion of incorporation to be used in the invention is preferably kept low, e.g. between 0.125, and 0.400 mole of 5-alkylidene norbornene-2 per 1000 g of polymer. This applies in particular if the norbornene derivative used is 5-ethylidene norbornene-2.

In the polymerization use is made of a coordination catalyst formed by combining a metal compound of the sub-groups 4 through 6, or 8, of Mendelejeff's periodic system, including thorium and uranium (the so-called "heavy-metal component") with a metal, alloy, metal hydride or organometal compound of a metal of the groups 1 through 3, or of the 4th main group of the abovementioned periodic system, (the so-called "aluminium component") in the presence, if so desired, of other substances, such as small amounts of compounds with free electron pairs, e.g. water, alcohol, oxygen or Lewis base. Preference is given to a catalyst obtained by combining vanadium and/or titanium compounds that are soluble in the dispersion agent, such as vanadium-oxytrichloride and/or vanadium tetrachloride, with one or more organic aluminium compounds, such as trialkylaluminum, dialkylaluminiummonohydrides, dialkylaluminium monohalides and/or monoalkylaluminium dihalides. More in particular, use is made of a combination of vanadiumoxytrichloride with monoethylaluminium dichloride and/or diethylaluminium monochloride. The ratio between the aluminium component and the heavy metal component may be varied within wide limits, e.g. between 2 : 1 and 100 : 1, and preferably between 3 : 1 and 15 : 1. In a continuous realization of the process the catalyst components are preferably supplied to the polymerization zone as a solution in a diluent.

The polymerization reaction is normally carried out at a temperature of between $-20$ °C and 80 °C, preferably between 10° and 50 °C. The pressure is usually between 1 and 50 atmospheres, but higher or lower pressures may also be employed. The process is preferably carried out continuously.

The diluent may be any liquid that is inert towards the catalyst, such as one or more saturated aliphatic hydrocarbons, such as butane, pentane, hexane, heptane or mineral oil fractions; aromatic hydrocarbons, e.g. benzene or toluene, or halogenated aliphatic or aromatic hydrocarbons, e.g. tetrachloroethylene.

Preferably, the process is conducted under such temperature and pressure conditions that one or several of the employed monomers, in particular the $\alpha$-alkene, e.g. propylene, will be in liquid form and be present in so large an amount as to act as the diluent. No other diluent need be used in that case. The process according to the invention can be carried out in a polymerization reactor filled with gas and liquid, but, preferably, in a reactor completely filled with liquid.

The molecular weight of the polymers can normally be varied by application of so-called chain-length controllers, such as acetylene, butadiene, zinc alkyls and alkyl halides, and preferably, hydrogen. Very small amounts of hydrogen already have a sufficient effect on the molecular weight, and are still soluble in the polymerization medium.

The polymer in the reaction mixture obtained from the polymerization may be recovered by distillation, with addition, if necessary, of water, steam or methanol; this treatment may be preceded, if so desired, by de-activation of the catalyst with water, alcohol or an acid.

The polymer obtained according to the invention usually contains between 20 and 74 % by weight of ethylene and between 24 and 78 % by weight of one or several other $\alpha$-alkenes, and at least 0.140 mole of dicyclopentadiene and 5-alkylidene norbornene-2 per 1000 g of polymer, the molar ratio of dicyclopentadiene to the 5-alkylidene norbornene-2 being lower than 1 : 5.

To the finished polymers the usual chemicals may be added, such as zinc oxide, stearic acid, sulphur, antioxidants, organic accelerators, e.g. tetramethyl thiuram disulphide, so-called tackifiers, dyes and pigments. If so desired, at least some of these additives may be present already during the polymerization, such as one or several anti-oxidants. These may be added as such, but preferably, they are dispersed in the liquid or liquids used as diluent in the polymerization, and/or in one or several of the liquid or liquefied monomers to be employed. It is also possible to add reinforcing or non-reinforcing fillers, such as whiting, kaolin and carbonblack and extender oils to the polymer; if desired, this may be done during the polymerization.

The cured polymers constitute a product with excellent properties that is suited for application in car tyres. Blending of the polymers according to the invention with other slightly unsaturated rubbers, e.g. butyl rubber and/or highly unsaturated rubbers e.g. butadienestyrene rubbers, and subsequent curing, yields products with very good mechanical properties. The polymers may further be employed in the production of bicycle tyres, conveyor belts, footwear, floor covering and sealing strips.

The polymers obtained according to the invention can be cured very easily by heating them in the presence of sulphur at 100°–250 °C, preferably at 140°–170 °C. If desired, use may be made of the curing recipes normally employed with butyl rubber. Free-radical sources, such as peroxides, may also be added, but this is not necessary.

The polymers obtained according to the invention may be processed to crumbs, sheets, strands or bales.

The cold-flow is determined as follows: the polymer is compressed to a solid cylinder or bale by exposing it for ½ minute to a pressure of 45 kg/cm$^2$ at 90 °C. The cylinder measures 15 mm in height and 18 mm in diameter; the dimensions of the bale are appr. 7.5 cm high; appr. 15 cm wide and appr. 30 cm long. At a temperature of 20 °C, the cylinder, or bale, is exposed to a load of 0.1 kg/cm$^{2,}$ which is approximately equivalent to the pressure exerted by a stack of bales measuring appr. 1.2 m in height. The cold-flow is expressed as the ratio (in %) of the height under load after a given length of time (24 h) to the original height without a load being applied. With strong cold-flow, the height under load decreases sharply and the ratio (in %) is consequently low; this is unfavourable. If there is no, or only very little cold-flow, the ratio is high, e.g. 85–95 %; an acceptable value is appr. 75–80 % or over. Samples that are to be compared should have approximately equal molecular weights, because this property has a marked effect on the cold-flow.

The tensile strength, the modulus of elongation and the elongation at break are measured according to NEN 5602; the permanent set according to NEN 5606; the hardness according to NEN 5601 (method 1); the tear strength according to NEN 5603 (left procedure); the compression set according to NEN 5611; the heat build-up according to ASTM D 623-58 (procedure A) and the rebound Lupke according to DIN 53512.

The examples given below serve to elucidate the invention, without limiting its scope in any way whatsoever.

EXAMPLES FOR COMPARISON

In a metal polymerisation reactor mixtures of ethylene and propylene are polymerized with 5-ethylidene norbornene-2, using a mixture of monoethyl-aluminum dichloride and diethylaluminium monochloride at 35 °C. Hydrogen is used as the molecular weight controller. The pressure is 20 at. The polymer is composed of 52.4 % by weight of ethylene, 41.1 % by weight of propylene and 6.5 % by weight of 5-ethylidene norbornene-2, or 52.7 % by weight of ethylene, 43.8 % by weight of propylene and 3.5 % by weight of 5-ethylidene norbornene-2. The Mooney plasticity of the polymers (ML 4°–100 °C) is 88 and 53 respectively.

Cylinders compressed out of the resulting polymer are used for cold-flow measurements under a load of 0.1 kg/cm$^2$. For the polymer with 6.5 % by weight of 5-ethylidene norbornene-2 the cold-flow measured after 24 hours equals 75 %, the corresponding value for the polymer with 3.5 % of 5-ethylidene norbornene-2 being only 48 %. This shows that with incorporation of 3.5 % by weight of 5-ethylidene norbornene-2 in the polymer the cold-flow behaviour is distinctly poor. Simple stacking of the bales of compressed polymer is not possible then.

To determine the level where the properties of the polymers are located, 100 parts by weight of the polymer with 3.5 % by weight of 5-ethylidene norbornene-2 are mixed with 5 parts by weight of zinc oxide
1 part by weight of stearic acid 50 parts by weight of carbon black ("high abrasion furnace ")
25 parts by weight of naphtenic oil ("Circosol 42 XH")
1 part by weight of tetramethyl thiuramdisulphide
0.5 parts by weight of 2-mercaptobenzthiazole
1.5 parts by weight of sulphur and cured for 10, 20 and 40 minutes at 160 °C. The values found for the various properties are given below:

|  | After curing at 160° for | | |
|---|---|---|---|
|  | 10 min | 20 min | 40 min |
| 300 % modulus (kg/cm$^2$) | 76 | 99 | 124 |
| Tensile strength (kg/cm$^2$) | 247 | 230 | 222 |
| Elongation at break (%) | 580 | 475 | 410 |
| Permanent set (%) | 5 | 5 | 5 |
| Hardness (°Shore A) | 65 | 66 | 67 |
| Tear strength (kg/cm$^2$) | — | 40 | — |
| Compression set (%) 70 °C | — | 15.2 | — |
| Heat build-up (°C) 37.5 °C | — | 29.8 | — |
| Rebound Lupke (%) 20 °C | — | 58 | — |
| Belt flex test 20 °C (min) | — | 560 | — |

EXAMPLE 1

Using the polymerization process discussed in the examples for comparison a polymer is prepared consisting of 51.9 % by weight of ethylene, 41.4 % by weight of propylene, 6.3 % by weight of 5-ethylidene norbornene-2 and 0.4 % by weight of dicyclopentadiene. The polymer has a Mooney plasticity (ML 4°–100 °C) equal to 83; exposed to a load of 0.1 kg/cm$^2$ for 24 hours, the polymer shows a cold-flow equal to 89 %.

Using the same curing recipe as that employed in the examples for comparison, and curing the mixture at 160 °C for 10, 20 and 40 minutes, yields the following values for the properties mentioned in the table below:

|  | After curing at 160° for | | |
|---|---|---|---|
|  | 10 min | 20 min | 40 min |
| 300 % modulus (kg/cm$^2$) | 124 | 153 | 163 |
| Tensile strength (kg/cm$^2$) | 235 | 222 | 219 |
| Elongation at break (%) | 470 | 400 | 350 |
| Permanent set (%) | 5 | 5 | 5 |
| Hardness (°Shore A) | 66 | 67 | 68 |
| Tear strength (kg/cm$^2$) | — | 39 | — |
| Compression set (%) 70 °C | — | 14 | — |
| Heat build-up (°C) 37.5 °C | — | 30 | — |
| Rebound Lupke (%) 20 °C | — | 59 | — |
| Belt flex test 20 °C (min) | — | 560 | — |

EXAMPLE 2

Using the same polymerization procedure as that employed in the examples for comparison, a polymer is made consisting of 52.2 % by weight of ethylene, 44.4 % by weight of propylene, 3.0 % by weight of 5-ethylidene norbornene-2 and 0.4 % by weight of dicyclopentadiene. The polymer has a Mooney plasticity (ML 4°–100 °C) equal to 53; exposed to a load of 0.1 kg/cm$^2$ for 24 hours, the polymer shows a cold-flow equal to 80.

Using the same curing recipe as that employed in the examples for comparison, and curing the mixture at 160 °C for 10, 20 and 40 minutes, yields the following values for the properties mentioned in the table below:

|  | After curing for | | |
|---|---|---|---|
|  | 10 min | 20 min | 60 min |
| 300 % modulus (kg/cm$^2$) | 76 | 102 | 124 |
| Tensile strength (kg/cm$^2$) | 249 | 228 | 224 |
| Elongation at break (%) | 580 | 480 | 420 |
| Permanent set (%) | 5 | 5 | 5 |
| Hardness (°Shore A) | 65 | 66 | 67 |
| Tear strength (kg/cm$^2$) | — | 40 | — |
| Compression set (%) at 70 °C | — | 15.5 | — |
| Heat build up (°C) 37.5 °C | — | 30 | — |
| Rebound Lupke (%) 20 °C | — | 58 | — |
| Belt flex test 20 °C (min) | — | 580 | — |

We claim:
1. Polymers composed of 20.0–74 % by weight of ethylene, 24 – 78 % by weight of one or more α-alkenes and at least 0.140 mole of dicyclopentadiene and 5-alkylidene norbornene-2 per 1000 g of polymer, the molar ratio of dicyclopentadiene to 5-alkenyl norbornene being lower than 1 : 6.

* * * * *